United States Patent [19]
Novak et al.

[11] Patent Number: 5,963,905
[45] Date of Patent: Oct. 5, 1999

[54] METHOD AND APPARATUS FOR IMPROVING ACOUSTIC FAST MATCH SPEED USING A CACHE FOR PHONE PROBABILITIES

[75] Inventors: Miroslav Novak, Mohegan Lake; Michael Alan Picheny, White Plains, both of N.Y.

[73] Assignee: International Business Machines Corporation, Armonk, N.Y.

[21] Appl. No.: 08/957,200

[22] Filed: Oct. 24, 1997

[51] Int. Cl.[6] .................................................. G10L 5/06
[52] U.S. Cl. ........................... 704/254; 704/256; 704/243
[58] Field of Search ...................................... 704/256, 254, 704/243

[56] References Cited

U.S. PATENT DOCUMENTS

| | | | |
|---|---|---|---|
| 4,759,068 | 7/1988 | Bahl et al. | 704/256 |
| 4,977,599 | 12/1990 | Bahl et al. | 704/256 |
| 5,621,859 | 4/1997 | Schwartz et al. | 704/256 |

OTHER PUBLICATIONS

Gopalakrishnan et al., "A Tree Search Strategy for Large–Vocabulary Continuous Speech Recognition", Proceedings of the IEEE ICASSP, pp. 572–575, 1995.

Bahl et al., "Performance of the IBM Large Vocabulary Continuous Speech Recognition System on the ARPA Wall Street Journal Task", Proceedings of the IEEE ICASSP, pp. 41–44, 1995.

Bahl et al., "A Fast Approximate Acoustic Match for Large Vocabulary Speech Recognition", IEEE Transactions on Speech and Audio Processing, vol. 1, No. 1, pp. 59–67, Jan. 1993.

Austin et al., "The Forward–Backward Search Algorithm", Proceedings of the IEEE ICASSP, pp. 697–700, 1991.

Bahl et al., "A Maximum Likelihood Approach to Continuous Speech Recognition", IEEE Transactions on Pattern Analysis and Machine Intelligence, vol. PAMI–5, No. 2, pp. 179–190, Mar. 1983.

*Primary Examiner*—David R. Hudspeth
*Assistant Examiner*—Daniel Abebe
*Attorney, Agent, or Firm*—F. Chau & Associates, LLP

[57] ABSTRACT

Methods and apparatus for performing a tree search based acoustic fast match in a speech recognition system for decoding a speech utterance, the tree having a tree root and tree nodes connected by tree branches, the tree nodes having phonetic models associated therewith, are provided. An illustrative embodiment of the method comprises: providing a cache having cache cells for storing phone probabilities therein; selecting a first branch leading to a next node, said branch selection starting at the tree root; accessing the cache to select a particular cache cell where the probability of a particular match is stored; evaluating the phonetic model to obtain the probability and storing the probability and an associated end time in the cache cell, if the cache cell accessed in the accessing step does not contain the required probability; using the probability value and the associated end time stored in the cache cell, if the cache cell accessed in the accessing step contains the required probability; selecting a new branch to proceed to the next node; and iteratively continuing from the accessing step until the whole tree is traversed and all possible word candidates associated with the speech recognition system are evaluated.

18 Claims, 5 Drawing Sheets

METHOD AND APPARATUS FOR IMPROVING ACOUSTIC FAST MATCH SPEED USING A CACHE FOR PHONE PROBABILITIES

BACKGROUND OF THE INVENTION

1. Field of the Invention

The present invention relates to speech recognition and, more particularly, to methods and apparatus for improving an acoustic fast match speed of a speech recognition system using a cache for phone probabilities.

2. Description of the Prior Art

In a speech recognition system, the acoustic fast match represents one of the three major functional components of the system, the other two being the detailed match and the language model. The role of the fast match is to select a short list of word candidates from the whole acoustic vocabulary for further evaluation in a particular time region of the decoded utterance.

Conventional approaches to the implementation of the acoustic fast match can be divided into two major groups, the synchronous search and the asynchronous search. The synchronous search is usually a form of the Viterbi search algorithm. At each instance, all necessary computations are performed, so the same time region of the utterance is never evaluated more than once. There are several disadvantages to this method. First, all the active word models have to be stored in memory, and thus memory requirements can be prohibitive in large vocabulary systems. Second, the estimation of word beginning probabilities requires the search to be performed in the backward direction, which significantly limits the use of this method in real-time applications. For a discussion of this type of approach, see Austin, S., Schwartz, et al., "The Forward-Backward Search Algorithm", ICASSP91, Toronto, Canada, pp. 697–700 (1991).

In a conventional asynchronous search, for a given time region of the utterance, the search is performed by computation of the total acoustic score for each word in the vocabulary, one word at a time. To reduce the amount of computations, the word phonetic sequences can be organized into a tree structure. The memory requirements are negligible when compared to the time synchronous method. The fast match search is performed each time a partial hypothesis (sequence of word, evaluated by the detailed match and the language model) needs to be extended. The ending time of such hypothesis is the starting time for the fast match, which means the beginnings of word candidates are already given and do not need to be calculated, thus the second problem of the synchronous search is eliminated. However, one of the disadvantages of this method is that the match has to be repeated for each new beginning time of the fast match search (even if the new time is relatively close to the previous one), thus it is possible that a certain region of the utterance is evaluated many times with the same phone sequence. For a discussion of this type of approach, see L. R. Bahl, et al., "A Fast Approximate Acoustic Match for Large Vocabulary Speech Recognition", IEEE Transactions on Speech and Audio Processing, vol. 1, no. 1, pp. 59–67 (January 1993).

SUMMARY OF THE INVENTION

It is an object of this invention to provide method and apparatus for increasing the speed of an acoustic fast match in a speech recognition system by employing a cache for phone model probabilities.

In one aspect of the present invention, a method for performing a tree search based acoustic fast match in a speech recognition system for decoding a speech utterance, the tree having a tree root and tree nodes connected by tree branches, the tree nodes having phonetic models associated therewith, the method comprising the steps of: providing a cache (i.e., memory) having cache cells for storing phone probabilities therein; selecting a first branch leading to a next node, said branch selection starting at the tree root; accessing the cache to select a particular cache cell where the probability of a particular match is stored; evaluating the phonetic model to obtain the probability and storing the probability and an associated end time in the cache cell, if the cache cell accessed in the accessing step does not contain the required probability; using the probability value and the associated end time stored in the cache cell, if the cache cell accessed in the accessing step contains the required probability; selecting a new branch to proceed to the next node; and iteratively continuing from the accessing step until the tree (preferably, the whole tree) is traversed and word candidates (preferably, all possible word candidates) associated with the speech recognition system are evaluated.

These and other objects, features and advantages of the present invention will become apparent from the following detailed description of illustrative embodiments thereof, which is to be read in connection with the accompanying drawings.

DETAILED DESCRIPTION OF REFERRED EMBODIMENTS

Before describing the inventive fast match search employing a cache according to the present invention, an explanation of the existing time asynchronous tree based fast match method will be given below. In an asynchronous fast match search, each word in the acoustic vocabulary is represented by a phonetic sequence. The acoustic match is performed on each phone from the left to the right. Concatenation of phonetic matches yields the final probability of the word. If two words share their first phones, the phonetic match need be performed only once and the result of the match can be used to continue in the matching of the remaining phones of each particular word.

Figure 1:
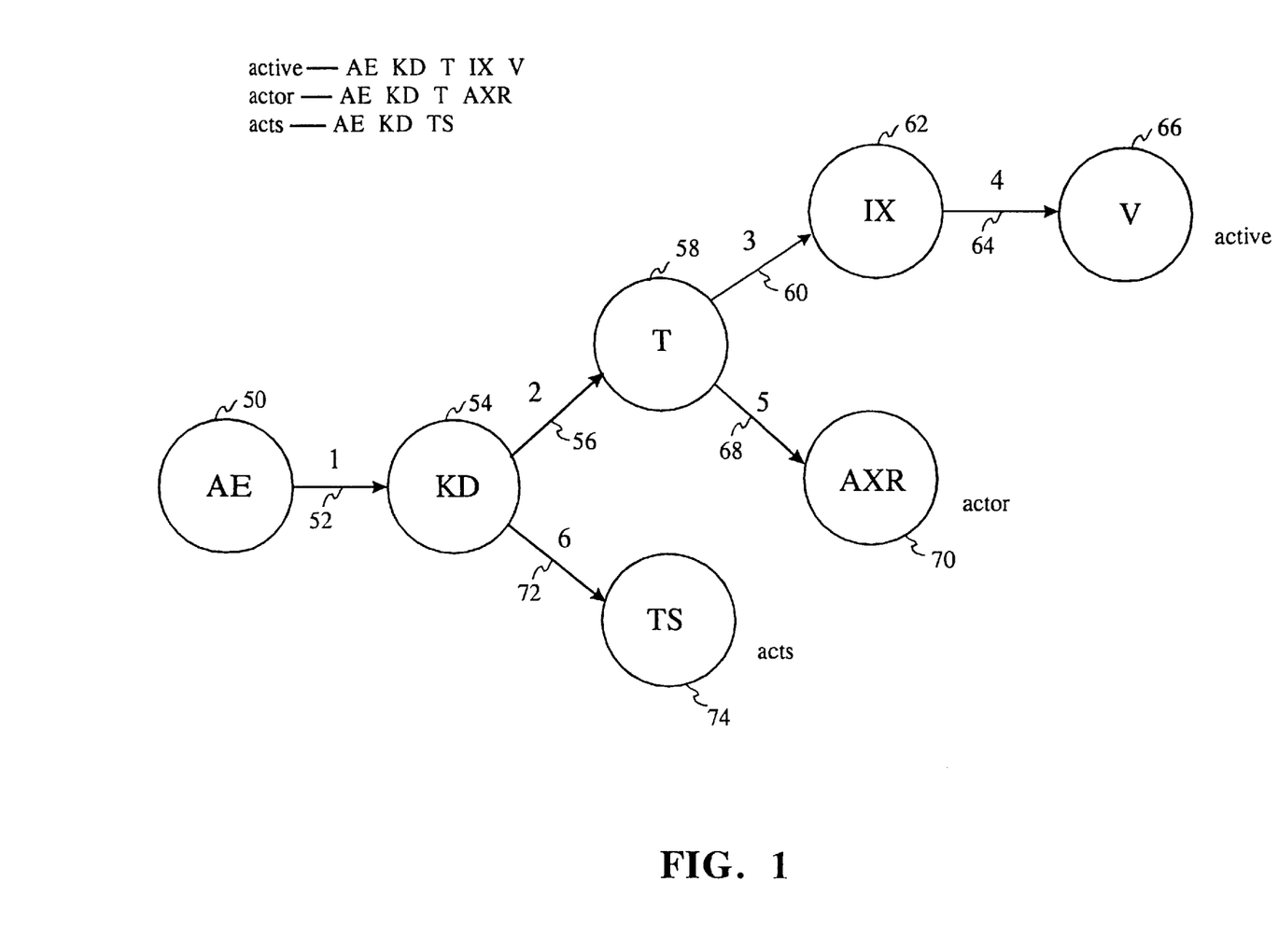
FIG. 1 illustrates a tree structure for three words (active, actor and acts) that share their first phones.

This allows the vocabulary to be organized into a tree structure. For example, FIG. 1 illustrates a tree structure for three words (active, actor and acts) that share their first phones. The root of the tree is a single node with one branch for each phone which can appear as a first phone in any of the vocabulary words. At any node, if there is a difference between the subsequent phones of two words, a new branch is created. Leaves of the tree represent complete words. The tree is traversed in a depth-first manner. Depth-first is the name of a particular known method of tree traversing.

Referring to FIG. 1, the search starts at the root node 50 and continues along the first branch 52 to the next node 54. At each subsequent node, one branch is chosen (in this case it doesn't really matter which one is selected first) and if the node to which this branch leads has further branches, again, one branch is selected until a leaf (66, 70, 74) is reached (no further branches). Then, a return tack to the previous node is made and one of the remaining branches (any branch which has not yet been traversed) is selected. Eventually, all branches (e.g., 52, 56, 60, 64, 68, 72) will be traversed and all nodes (e.g., 50, 54, 58, 62, 66, 70, 74) visited. FIG. 1 shows the order in which the branches are traversed for the three word example.

Each node represents one phone model. Next, an acoustic match of the model is performed, the result of which is an a posteriori probability and an end time distribution. The end time distribution is used to continue in the match of subsequent phone models. The time at which this distribution reaches its maximum value is referred to as a most likely boundary and is used to represent an end time ($t_{end}$) of the phone match. The end time distribution is not actually needed when the node (leaf) is reached. The final score of a word is obtained by accumulation of the individual phone probabilities.

It is generally known that the speed of the search can be increased by limiting the number of visited leaves. Anytime the total probability of a tree path falls below a certain threshold, a return to the parent (previous) node is performed even if the leaf was not reached.

Figure 2:
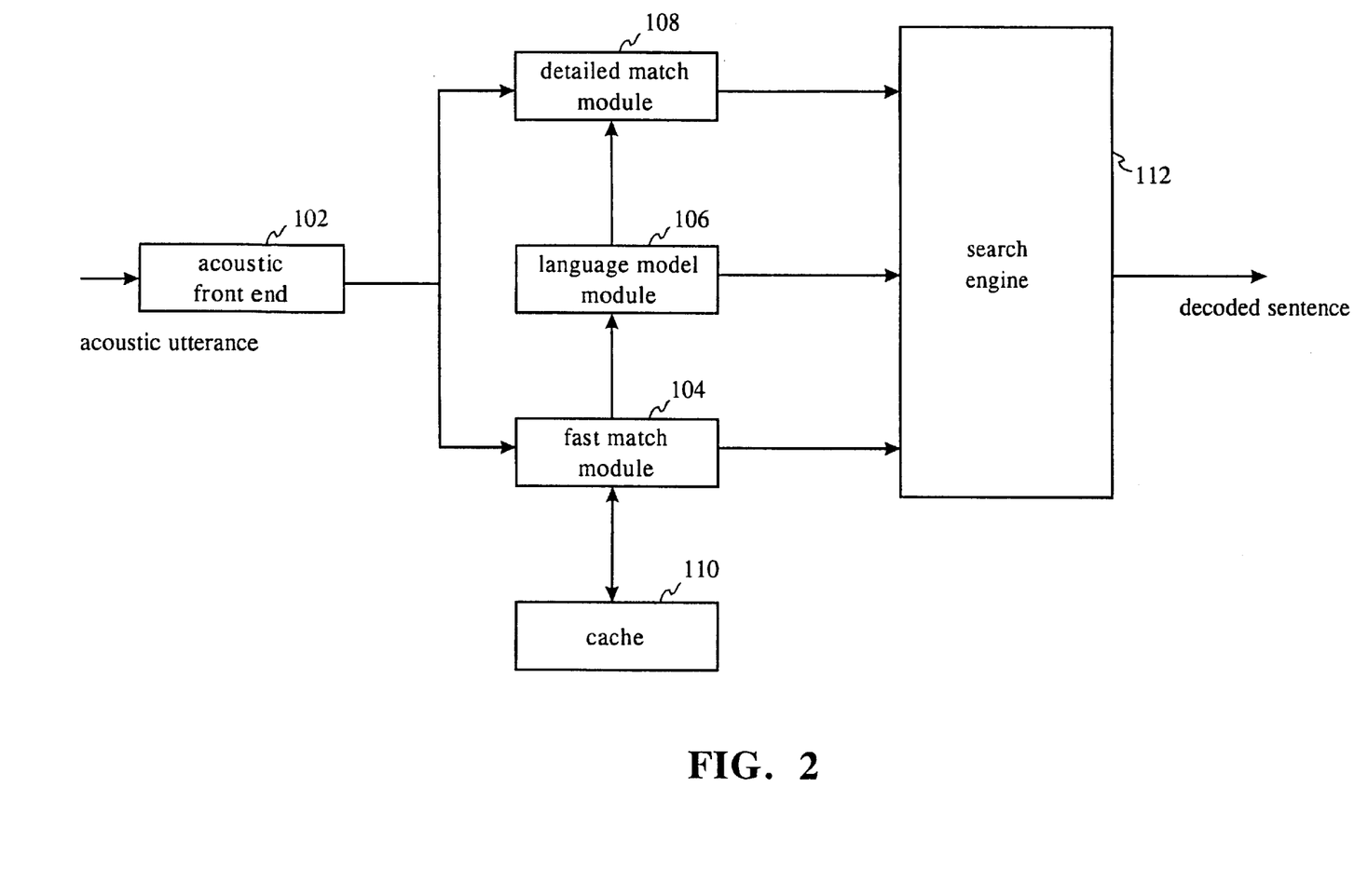
FIG. 2 is a block diagram of a speech recognition system employing a cache according to the invention.

In accordance with the present invention, a significant reduction of unnecessary phonetic matches in a fast match search may be achieved by employing a cache (i.e., memory), as will be explained below. FIG. 2 is a block diagram of a speech recognition system employing a cache according to the invention. The system includes an acoustic front-end 102 operatively coupled to a detailed match module 108 and a fast match module 104. The fast match module 104 is operatively coupled to a language model module 106 and a cash 110. The language model module 106 is also operatively coupled to the detailed match module 108. The fast match module 104, the language model module 106 and the detailed match module 108 are operatively coupled to a search engine 112. A speech utterance enters an acoustic front-end 102 which extracts acoustic features from the speech utterance thereby generating feature vectors, as is known. The fast match module 104 processes the feature vectors first to provide a list of word candidates for the language model module 106 and the detailed match module 108 in each iteration of the search performed in accordance with the search engine 112. It is to be appreciated that the functions of the detailed match module, the language model module and the search engine are known, for example, see L. R. Bahl, et al., "A Maximum Likelihood Approach to Continuous Speech Recognition", IEEE Transactions on Pat. Anal. and Mac. Int.", vol. PAMI-5, pp. 179–90 (January 1993) and P. S. Gopalakrishnan, et al., "A Tree Search Strategy for Large-Vocabulary Continuous Speech Recognition", ICASSP, vol. 1, pp. 572–75 (1995). Advantageously, before the acoustic match in the fast match module 104 is performed, the cache 110 is referenced first since it may already contain information needed to generate the list of word candidates, as will be explained.

It is to be appreciated that two words can share a phonetic sequence not only at the beginning but at the end as well. The problem is that the result of each single phonetic match depends on the complete history of the whole match. Thus, two branches of the fast match tree represented by an identical phone sequence from a certain node to the leaf cannot be simply merged. Though the result of a single phone match theoretically depends on the complete match history from the beginning of the utterance, this dependance is usually limited to the immediate predecessor of the phone being matched. It can be assumed that the results of a single phone match of two identical phones located in two different positions of the fast match tree will be very similar, if the following conditions are satisfied. First, the previous phones are identical. Second, the end times of the previous phones are substantially identical.

Figure 3:
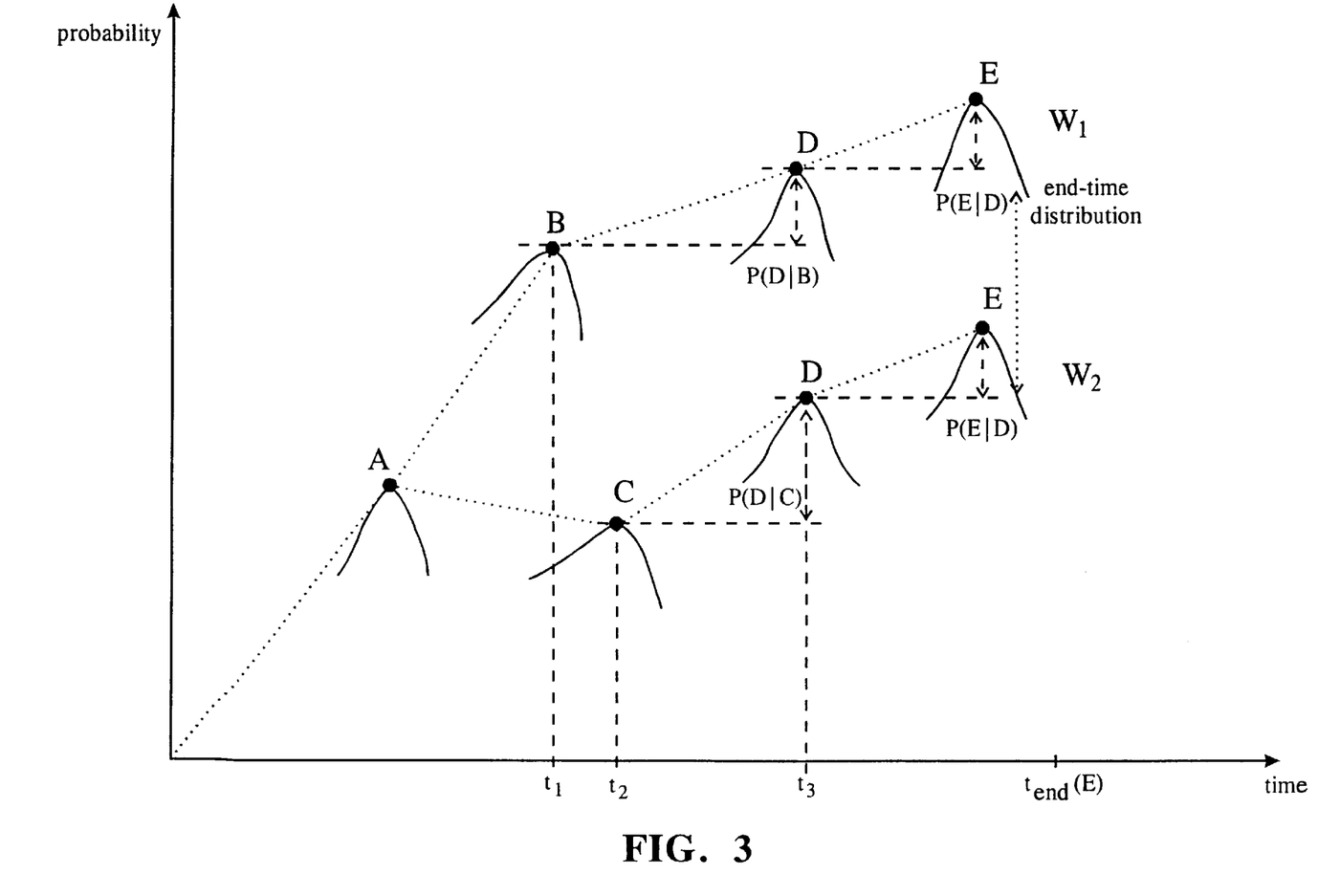
FIG. 3 illustrates the probability distributions of phones making up two respective words from a vocabulary.

The value used as the ending time $t_{end}$ of the previous phone is referred to as a most likely end time. This phrase will be explained with reference to FIG. 3, which illustrates the probability distributions of phones making up two respective words from a vocabulary. The most likely end time of a phone is the maximum point of the end time distribution curve for that phone (i.e., where the curve for a particular phone has the highest value). In FIG. 3, the two words, $W_1$ and $W_2$, have phonetic sequences A B D E and A C D E, respectively. The score of the phone D in the word $W_1$ will be different from the one of phone D in the word $W_2$, since the acoustic matches start at different times ($t_1$ for $W_1$ and $t_2$ for $W_2$), connecting to different phones in each case (B for $W_1$ and C for $W_2$). On the other hand, the scores of phones E in both words will be very similar, since the matches start at the same time ($t_3$), connecting to the same phones.

Accordingly, given these conditions (i.e., the previous phones and the end times of the previous phones are substantially identical), a fast match method employing a cache according to the present invention may be performed in the following manner.

First, start at the tree root and select the first branch leading to the next node (hereinafter referred to as a "current node"). Next, access the cache using the identity of the current phone $P_{curr}$ (associated with the current node), the identity of the previous phone $P_{prev}$ (associated with the previous node), and the end time of the previous phone $t_{end}$, to select a particular memory location where the result of the particular match is stored (cache cell).

If the cache cell of this particular context doesn't contain the required probability, evaluate the phonetic model the same way as in the conventional method to obtain the probability and store the probability in the cache cell together with end time $t_{end}$. To perform this evaluation, the complete "end time distribution" of the previous phone must be available. If not (in the case when the phone model match was not performed because the cache probability was used), back-off to the first lower level in the tree for which this distribution is available and perform the match first.

If the cache contains the required probability, use this value and the associated end time $t_{end}$. Then, select a new branch and proceed to the next node and iteratively continue from the cache accessing step until the tree (preferably, the whole tree) is traversed and word candidates (preferably, all possible word candidates) are evaluated.

Figure 4:
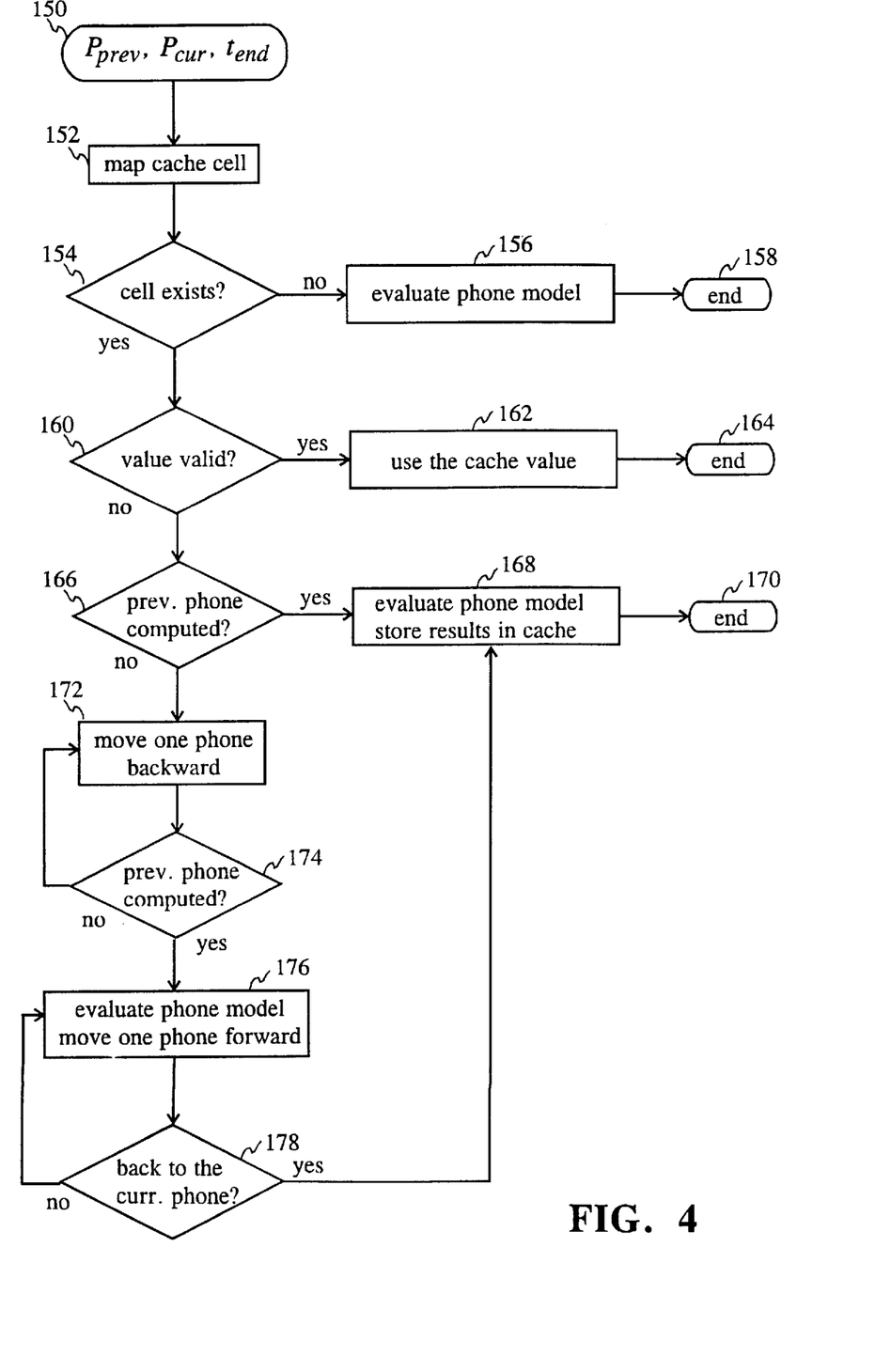
FIG. 4 is a flow chart pertaining to the portion of the fast match method which involves cache access according to the invention.

A flow chart of the method portion which handles the cache access is shown in FIG. 4. The method is as follows. The first step is to identify the identity of a current phone, the identity of a previous phone, and the end time of the previous phone (block 150), which are used to access the cache cells. Then, the next step is to map a cache cell (block 152), which refers to the operation of localizing an actual cell for storing or retrieving probability information. Next, it is determined whether a particular cache cell exists (block 154). If the cache cell determined at block 154 does not exist, a phone model is evaluated (156) as in a fast match search.

However, if the cell determined at block 154 exists, it is determined whether the value is valid (block 160). If the value determined at block 160 is valid, the value stored in the cache is used (block 162).

Next, if the value determined at block 160 is not valid, it is determined whether the previous phone was computed (block 166). If the previous phone was computed at block 166, then the corresponding phone model is evaluated and the results are stored in a cache cell (block 168).

The following step is to move one phone backward, if the previous phone determined at block 166 was not computed (block 172). Next, it is determined whether the previous phone was computed (block 174).

If the previous phone determined at block 174 was not computed, go back to block 172. However, if the previous phone determined at block 174 was computed, evaluate the phone model and move one phone forward (block 176).

Next, it is determined whether moving one phone forward returns the process back to the current phone (block 178). If moving one phone forward does not return the process back to the current phone as determined in block 178, then go back to step 176. However, if moving one phone forward does return the process back to the current phone as determined in block 178, evaluate the phone model and store the results in cache (block 168).

The non-availability of the proper probability in the cache cell, as determined in block 160, is indicated by setting the initial value of the end time to a non-existing value (such as −1). However, after the cache cell is filled with proper values, a non-negative value of the end time indicates that the values stored in the cell can be used, as per block 162.

The cache is accessed as a 3-dimensional array (due to the three variables used to access the cache, i.e., the previous phone, the current phone, and the end time), thus the realization would require a prohibitive amount of memory for a given number of phones and time range. If the vocabulary uses 50 distinct phones (e.g., for U.S. English) and we want to store the probabilities in a region of about 1 second (which corresponds to 100 feature vectors produced by the acoustic front end 102), we would need 2500*100 (250 k) cells in the cache. Each cell needs about 4 bytes to store the actual probability. This means that we would need about 1 MB of memory for each 1 second of speech.

In accordance with the present invention, the required amount of memory can be reduced, by a mapping of all possible combinations of the current and previous phones (hereinafter referred to as "di-phones") to a set of unique indexes. The mapping enables the cache to now be accessed as a virtual 2-dimensional array (i.e., the index and the end time). Since only certain di-phones exist in the given vocabulary, the number of indexes will be much lower than $N^2_p$ (where $N_p$ is the size of the phonetic alphabet), which would be otherwise required for all combinations. Further reduction can be achieved by taking into account the fact that certain di-phones are located only in the higher layers of the fast match tree, thus they won't be accessed very often and could be omitted from the cache use without a significant loss of efficiency.

Furthermore, providing sufficient memory for an extended time range can be achieved by quantization of the end time value $t_{end}$. Since the actual end time depends mostly on the local acoustic features of the utterance and less on the history of the match, fluctuation of this value, with respect to different positions of the matched phone in the tree, is very unlikely. A short time interval (about 1 to 4 frames) can be served by a single cache cell.

The value of $t_{end}$ represents the elapsed time measured from the beginning of the utterance. The components of the speech recognition system, such as shown in FIG. 2, perform the iterative search in a local time region which slowly moves forward with the progress of the decoding. The cache needs to cover only this local time region. For example, if the cache can cover a time region of about 1 second wide (100 acoustic frames), the cache will be used to store the probabilities in the region of the last 1 second of the acoustic utterance being decoded. The actual value of the time needs to be converted to a value which will always lie within the 1 second interval. Since two different times could map to the same value when the cache is accessed (if they are more than 1 second apart), we need to preserve the information about the original time value (before the mapping). For that reason, the original value of the time is also inserted into the cell together with other information (probability and $t_{end}$ of the phone).

Figure 5:
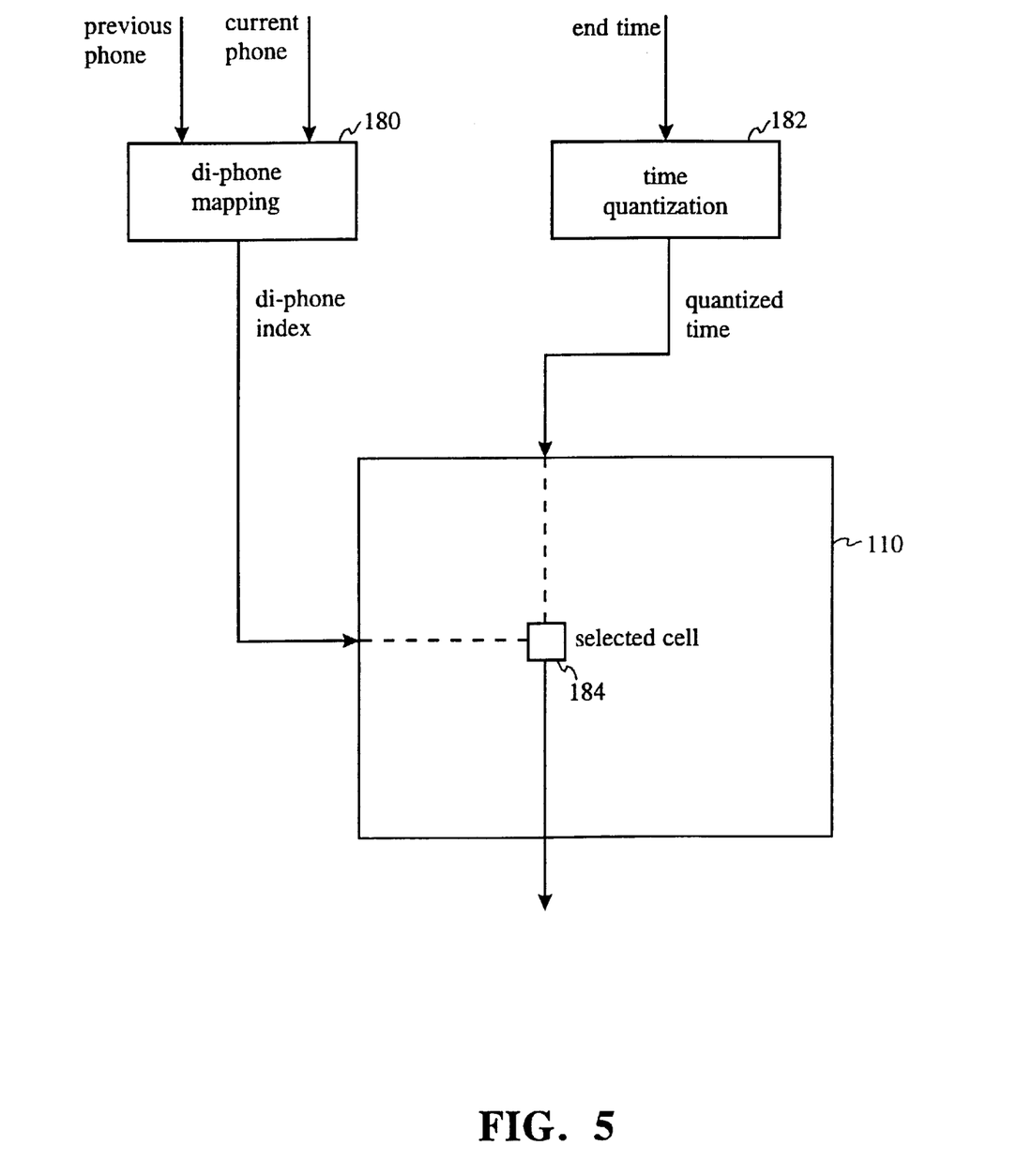
FIG. 5 is a schematic diagram illustrating cache cell access of the invention.

The cache cell selection is schematically shown in FIG. 5. Accordingly, the following procedure is performed. The pair of values $P_{curr}$ and $P_{prev}$ is mapped into a unique di-phone index (block 180). Thus, during decoding, if for a certain di-phone no index exists, no selection is made. Further, the end time value $t_{end}$ is quantized and mapped into the cache time region (block 182), using the following formula:

$$\bar{t} = (t_{end}/Q) \text{ modulo } T_c$$

where Q is the time quantization coefficient and $T_c$ is the size of the time region (after the time quantization is applied) covered by the cache 110. The mapped time value (used to access the cache) always lies in the interval $(0, T_c)$. Since at some previous time, the same cache cell 184 might have been already accessed (due to the fact that the two different times can be mapped into the same value), it is essential to verify that the information in the cache cell 184 corresponds to the right time value. For that purpose, the original (before mapping) access time value is stored in the cache cell 184. When a cell 184 is accessed, and the access time stored in the cell indicates an earlier time, the contents of the cell are discarded and the cell is used to hold information for the new access time.

It is to be appreciated that the main functional components (e.g., fast match module 104, language model module 106, detailed match module 108, cache 110 and search engine 112) illustrated in FIG. 2 are functional in nature and, thus, may be implemented in hardware, software or a combination thereof. In preferred embodiments, apparatus and methods of the present invention may be implemented as software modules on one or more appropriately programmed general purpose computers having a processor(s), memory and input/output interfaces associated therewith for executing the functions associated with the main components of the invention. Of course, special purpose processors may be employed. In a preferred implementation, the cache functions described herein may be performed by memory associated with the appropriately programmed computer(s). Also, although not expressly shown in FIG. 2, the speech utterances provided to the acoustic front-end 102 are provided through an audio-to-analog transducer (microphone) in order to generate electrical signals representative of the speech uttered by a speaker. Given the teachings provided herein, one of ordinary skill in the art will contemplate various other implementations of the functional components of the present invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for performing a tree search based acoustic fast match in a speech recognition system for decoding a speech utterance, the tree having a tree root and tree nodes connected by tree branches, the tree nodes having phonetic models associated therewith, the method comprising the steps of:

(a) providing a cache having cache cells for storing phone probabilities therein;

(b) selecting a first branch leading to a next node, said branch selection starting at the tree root;

(c) accessing the cache to select a particular cache cell where the probability of a particular match is stored;

(d) evaluating the phonetic model to obtain the probability and storing the probability and an associated end time in the cache cell, if the cache cell accessed in the accessing step does not contain the required probability;

(e) using the probability value and the associated end time stored in the cache cell, if the cache cell accessed in the accessing step contains the required probability;

(f) selecting a new branch to proceed to the next node; and (g) iteratively continuing from the accessing step until the tree is traversed and the word candidates associated with the speech recognition system are evaluated.

2. The method of claim 1, wherein step (g) further includes traversing the whole tree and evaluating all possible word candidates.

3. The method of claim 1, wherein the cache is accessed as a two-dimensional array.

4. The method of claim 1, wherein the cache is accessed as a three-dimensional array.

5. The method of claim 4, wherein the cache cell is selected in the accessing step based on the identity of a corresponding current phone, the identity of a corresponding previous phone, and a corresponding end time of the previous phone.

6. The method of claim 5, wherein the corresponding current phone identity of the current phone is associated with the next node of step (b).

7. The method of claim 5, wherein the corresponding previous phone identity is associated with a corresponding previous node.

8. The method of claim 5, wherein combinations of current phones and previous phones are mapped into the cache cells.

9. The method of claim 1, wherein the step of accessing the cache comprises:

mapping an identity of a current phone and an identity of a previous phone into a di-phone index;

determining if, for a certain di-phone, an index exists; and quantizing and mapping an end time value.

10. The method of claim 9, wherein the accessing step further includes inserting an earlier access time into a cache cell to indicate that said cell contains a probability relevant to a subsequent access time.

11. The method of claim 9, wherein the accessing step further comprises discarding a probability stored in a cell when a selected cell indicates an earlier access time.

12. An apparatus for performing a tree search based acoustic fast match, the tree having a tree root and tree nodes connected by tree branches, the tree nodes having phonetic models associated therewith, the apparatus comprising:

(a) a cache having cache cells for storing phone probabilities therein;

(b) means for selecting a first branch leading to a next node, said branch selection starting at the tree root;

(c) means for accessing the cache to select a particular cache cell where the probability of a particular match is stored;

(d) means for evaluating the phonetic model to obtain the probability and storing the probability and an associated end time in the cache cell, if the cache cell accessed in the accessing step does not contain the required probability;

(e) means for using the probability value and the associated end time stored in the cache cell, if the cache cell accessed in the accessing step contains the required probability; and (f) means for selecting a new branch to proceed to the next node and iteratively continuing from the accessing function of the accessing means until the tree is traversed and the word candidates associated with the speech recognition system are evaluated.

13. The apparatus of claim 12, wherein an earlier access time is inserted into a cache cell to indicate that said cell contains a probability relevant to a subsequent access time.

14. The apparatus of claim 12, further comprising means for discarding a probability stored in a cell when a selected cell indicates an earlier access time.

15. An apparatus for performing a tree search based acoustic fast match, comprising:

means for performing an iterative search in a local time region;

a cache having cache cells for storing phone probabilities therein;

means for mapping an identity of a current phone and an identity of a previous phone into a di-phone index;

means for quantizing and mapping an end time value;

means for determining if, for a certain di-phone, an index exists; and means for selecting a cache cell with respect to a particular end time value if, for a certain di-phone, an index exists.

16. The apparatus of claim 15, wherein an earlier access time is inserted into a cache cell to indicate that said cell contains a probability relevant to a subsequent access time.

17. The apparatus of claim 15, further comprising means for discarding a probability stored in a cell when a selected cell indicates an earlier access time.

18. A method for improving tree search based acoustic fast match speed using a cache for phone probabilities, comprising the steps of:

(a) inputting the identity of a current phone, the identity of a previous phone, and the end time of the previous phone;

(b) mapping a cache cell;

(c) determining whether a cell exists;

(d) evaluating a phone model, if the cell determined at step (c) does not exist;

(e) determining whether the value is valid, if the cell determined at step (c) exists;

(f) using a cache value determined at step (e), if the value determined at step (e) is valid;

(g) determining whether the previous phone was computed, if the value determined at step (e) is not valid;

(h) evaluating the phone model and storing the results in cache, if the previous phone was computed at step (g);

(i) moving one phone backward, if the previous phone determined at step (g) was not computed;

(j) determining whether the previous phone was computed;

(k) going back to step (i), if the previous phone determined at step (j) was not computed;

(l) evaluating the phone model and moving one phone forward, if the previous phone determined at step (j) was computed;

(m) determining whether the one move forward is back to the current phone;

(n) going back to step (l), if the one move forward is not back to the current phone as determined in step (m); and (o) evaluating the phone model and storing the results in cache, if back to the current phone as determined in step (m).

* * * * *